United States Patent [19]

Liljestrand

[11] 4,394,140

[45] Jul. 19, 1983

[54] DEGASSING SYSTEM AND CENTRIFUGAL PUMP

[75] Inventor: Walter E. Liljestrand, Houston, Tex.

[73] Assignee: Smith International, Inc., Newport Beach, Calif.

[21] Appl. No.: 365,402

[22] Filed: Apr. 5, 1982

Related U.S. Application Data

[63] Continuation-in-part of Ser. No. 865,989, Dec. 30, 1977, Pat. No. 4,331,458.

[51] Int. Cl.$^3$ ................... B01D 19/00; B01D 45/00
[52] U.S. Cl. .................................. 55/184; 55/192; 55/406
[58] Field of Search ............... 55/52, 55, 184, 192, 55/201, 204–206, 406, 459 R; 415/121 R, 121 A, 206

[56] References Cited

U.S. PATENT DOCUMENTS

| | | | |
|---|---|---|---|
| 2,216,939 | 10/1940 | Dodge | 55/184 |
| 2,887,959 | 5/1959 | Stefano | 55/201 |
| 2,889,005 | 6/1959 | Umbricht | 55/406 X |
| 3,058,720 | 10/1962 | Hart et al. | 415/121 A |
| 3,406,500 | 10/1968 | Deming | 55/406 X |
| 3,769,779 | 11/1973 | Liljestrand | 55/192 X |
| 3,887,342 | 6/1975 | Bunnelle | 55/406 X |
| 3,973,930 | 8/1976 | Burgess | 55/55 X |
| 4,046,528 | 9/1977 | Liljestrand | 55/192 X |
| 4,084,946 | 4/1978 | Burgess | 55/192 X |

Primary Examiner—Robert H. Spitzer
Attorney, Agent, or Firm—Browning, Bushman, Zamecki & Anderson

[57] ABSTRACT

A system for degassing liquid containing mediums, particularly drilling muds which includes a suitable degassing vessel and a vertical shaft centrifugal pump for introducing the liquid medium into the degassing vessel, the pump having the capability of handling liquid mediums of widely varying viscosities and being provided with an inlet housing disposed generally between a pump frame defining a vent chamber and a pump casing, the latter having disposed therein a pump impeller for pumping the liquid medium into the degassing vessel. The inlet housing contains an inlet impeller for directing liquid from the vent chamber downwardly into the inlet housing. Egress passages communicating with the inlet housing direct gas accumulating in the upper portion of the inlet housing vertically upwardly away from the inlet housing.

40 Claims, 11 Drawing Figures

DEGASSING SYSTEM AND CENTRIFUGAL PUMP

CROSS-REFERENCE TO RELATED APPLICATION

This is a continuation-in-part of copending U.S. application Ser. No. 865,989, filed Dec. 30, 1977, now U.S. Pat. No. 4,331,458.

BACKGROUND OF THE INVENTION

The present invention relates to a system and pump for degassing liquid containing medium, and, more particularly, to a system and pump for degassing drilling muds and the like.

U.S. Pat. Nos. 3,769,779 and 4,046,528 describe degassing systems for the treatment of drilling muds or other liquid containing mediums which are laden with dissolved and/or physically entrained gas. As taught in the aforementioned patents, the presence of gas in drilling muds decreases the mud weight and increases viscosity thus diminishing its effectiveness in preventing blowouts. Since it is not economically feasible to continuously use a source of new mud in the drilling operation, it is necessary that the used mud be treated and reconditioned so that it can be recycled for downhole usage.

A particular problem which occurs in the case of drilling muds, but which may occur in numerous other instances as well, is that the mud may vary in viscosity depending on the depth of the well, the formations encountered and other such factors. Additionally, dilution or concentration of the mud may unexpectedly occur while the mud is being used, resulting in a viscosity change. While the viscosity can be readjusted before the mud is reused, it is necessary that any degassing system be capable of treating muds with different and changing viscosities, particularly since the viscosities may change markedly and dramatically during the drilling operation.

Accordingly, a degassing system which has the capability of handling drilling muds or like liquid containing mediums of varying and differing viscosities is most desirable.

SUMMARY OF THE INVENTION

It is therefore an object of the present invention to provide an improved system for degassing liquid containing mediums.

It is a further object of the present invention to provide an improved system for the degassing of drilling muds.

Another object of the present invention is to provide a degassing system for use with liquid containing mediums, such as drilling muds, of high viscosity.

An important object of the present invention is to provide a system for degassing liquid containing mediums of widely varying viscosities.

Still another object of the present invention is to provide a centrifugal pump for handling gas laden, liquid containing mediums of varying viscosities.

The above and other objects of the present invention will become apparent from the drawings, the description given herein and the appended claims.

In one respect, the present invention provides an improved degassing system including a degassing vessel having an inlet and an outlet for the intake and discharge of the liquid containing medium being treated, the liquid medium being introduced into the degassing vessel by means of a generally vertical shaft centrifugal pump of novel construction. The pump includes an inlet housing, a pump casing disposed below the inlet housing and a pump frame at least partially defining a vent chamber disposed above the inlet housing. The interior of the inlet housing, the vent chamber and the interior of the pump casing are in open communication with one another, an apertured partition serving to partially define the vent chamber and generally separate the interior of the inlet housing from the vent chamber. A pump impeller is rotatably disposed in the pump casing, the pump casing having a discharge for the liquid containing medium. An inlet impeller is rotatably mounted in the inlet housing closely adjacent the apertured partition. The inlet impeller is designed to direct fluid from the vent chamber into the inlet housing and generally toward the pump casing.

It has been found that, in operation, gas, particularly in the form of froth, may tend to accumulate in the upper portion of the inlet housing, beneath the apertured partition which divides the inlet housing from the vent chamber. In the present invention, egress passage means are provided, communicating with the upper portion of the inlet housing, adjacent the apertured partition, and adapted to direct any gas accumulating there vertically upwardly away from the inlet housing. This egress passage means may be designed to direct the gas to the outside of the pump, or alternatively, into the vent chamber located above the inlet housing. In either case, and while the egress passage means may include laterally oriented portions, it also includes at least some generally vertically oriented portions so that the accumulated gas is positively directed upwardly away from the inlet housing.

The present invention also contemplates a generally vertical shaft centrifugal pump such as described above for use with the degassing system of the present invention, the centrifugal pump being ideally suited for handling liquid containing mediums which contain either dissolved and/or physically entrained gas.

DESCRIPTION OF THE PREFERRED EMBODIMENTS

In the description which follows, the invention will be described with reference to the degassing of drilling muds. It is to be understood, however, that the invention is not so limited and that the degassing system and pump disclosed herein are useful in degassing or handling virtually any liquid containing medium which contains entrained and/or dissolved gases. As used herein, the term "liquid containing medium" refers to a liquid, as that term is commonly used, and which may be a pure liquid, a solution of two or more miscible liquids, mixtures of miscible and immiscible liquids, solutions of solids and liquids, mixtures of liquids and suspended solids such as slurries and, for that matter, any medium in which at least one of the components is a liquid component under the temperatures and pressures at which it is being processed. The terms "vertical shaft," "vertical" or like references used in describing the relative positioning of the pump shaft are not intended to restrict the pump disposition to a perfectly vertical or even only slightly off vertical position. Rather, such terms are intended to describe a centrifugal pump wherein the pump intake is at a point above the pump discharge. Thus, the pump shaft could be disposed at angles of 45° and greater to the vertical and still be considered a vertical pump or a vertical shaft pump for purposes of the present invention.

Figure 1:
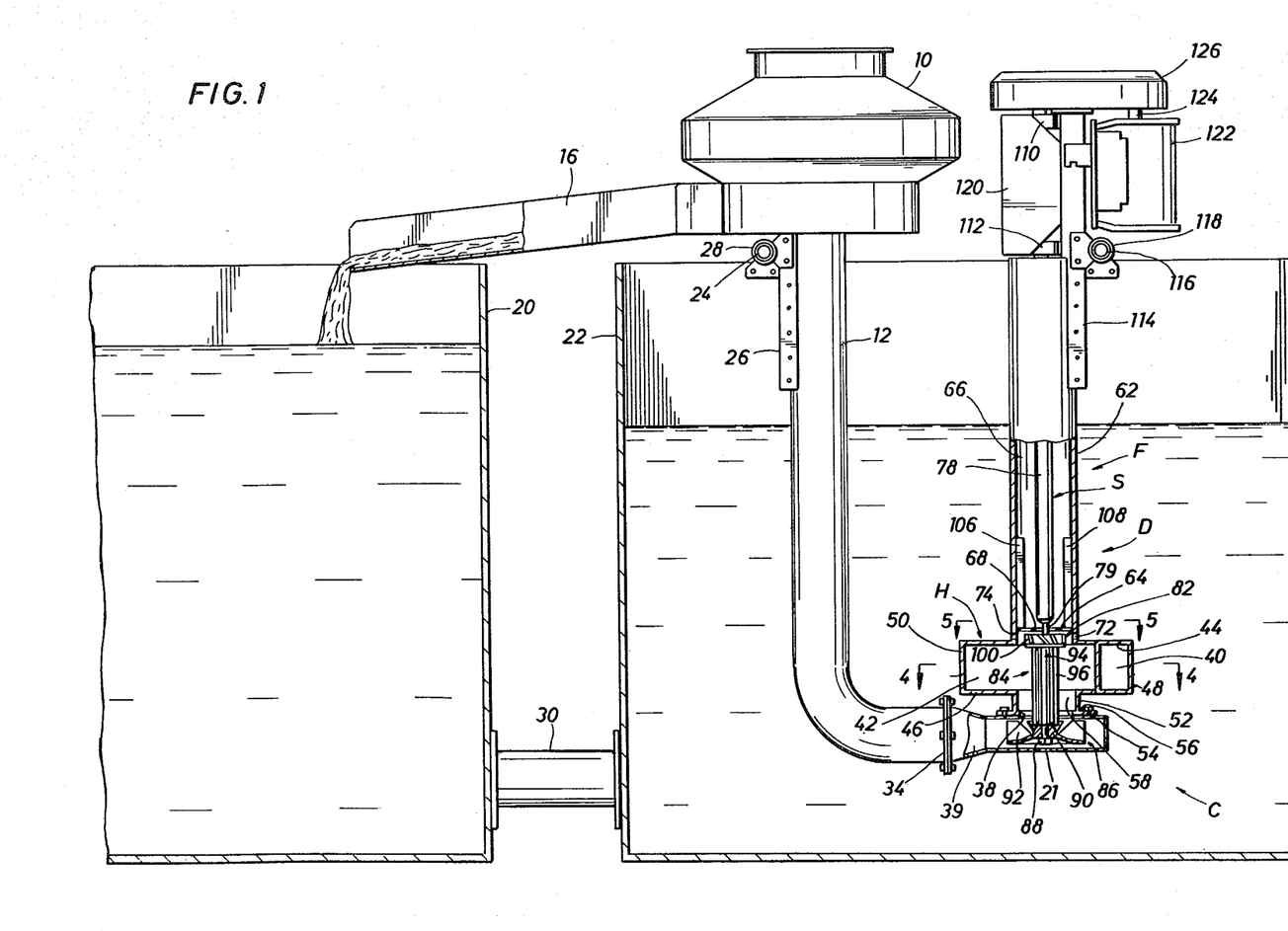
FIG. 1 is an elevational view, partly in section of the degassing system.
Figure 2:
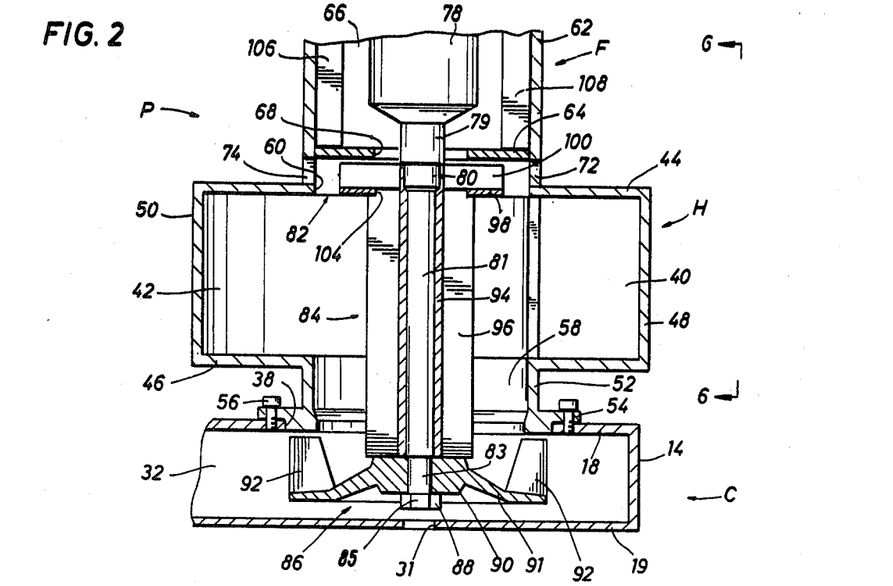
FIG. 2 is an enlarged view, in elevation, and partly in section, showing the construction of the centrifugal pump of the degassing system.

Referring first then to FIGS. 1 and 2, there is shown basically a degassing system such as described in U.S. Pat. No. 4,046,528. The degassing vessel 10, the construction and operation of which is substantially the same as that of the degassing vessel shown in U.S. Pat. No. 3,769,779, is connected to a riser pipe 12 which in turn is connected to a centrifugal pump P described more fully hereafter, pump P serving to force the mud into degassing vessel 10. A trough 16 leads from degassing vessel 10 and is used to transport the degassed mud from vessel 10 into clean mud pit 20.

Degassing vessel 10 is supported on return mud pit 22 by means of a bracket 28 and support pipe 24 which spans mud pit 22. Bracket 28 is adjustably secured to a bracket support 26 affixed to riser pipe 12.

Clean mud pit 20 and return mud pit 22 are connected by a return conduit 30 which serves to ensure that return mud pit 22 will always have a supply of mud available for the degassing system to circulate or that a constant supply of mud will always be available to be fed into the well, if needed, as the case may be.

Pump P is comprised of a pump casing, shown generally as C, an inlet housing, shown generally as H, and a pump frame, shown generally as F. Pump casing C is of the single volute type and is formed by a vertical wall 14, a top wall 18 and a bottom wall 19. Mud is discharged from pump casing C through generally tangential discharge 32 which is connected by suitable flange connection 34 to the intake of riser pipe 12. A generally centrally disposed circular aperture 38 is formed in the top wall 18 of pump casing C, aperture 38, as seen hereafter, cooperating with a portion of inlet housing H to form an axial intake for liquid containing medium into pump casing C.

Figures 3, 6:
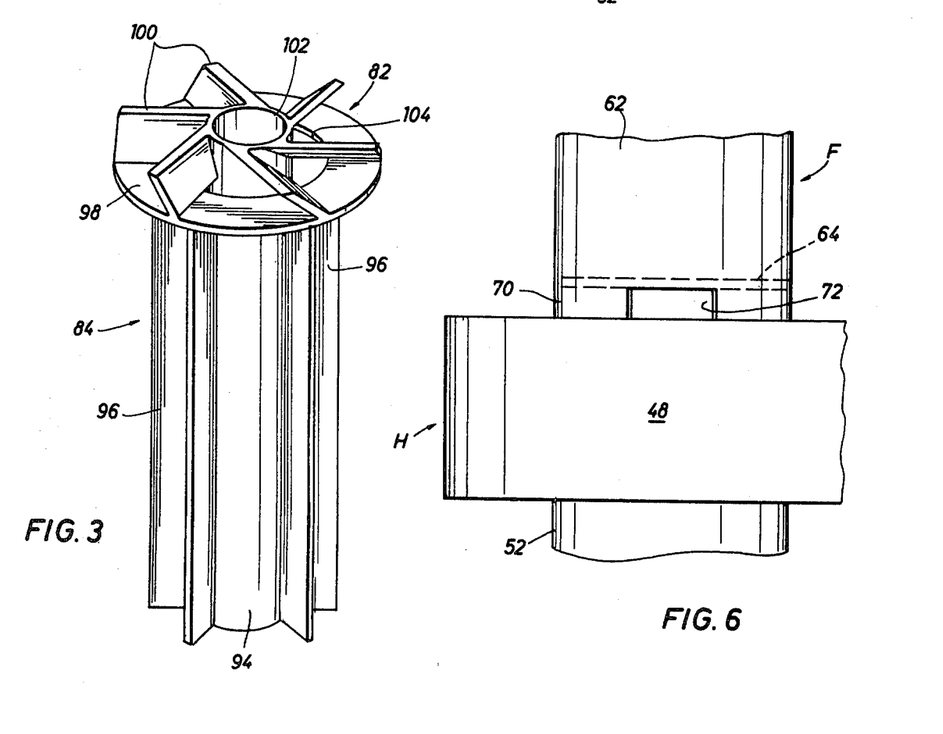
FIG. 3 is an isometric view of an inlet impeller and rotor for use in the pump of the present invention.
FIG. 6 is a view taken along the lines 6—6 of FIG. 2.
Figure 4:
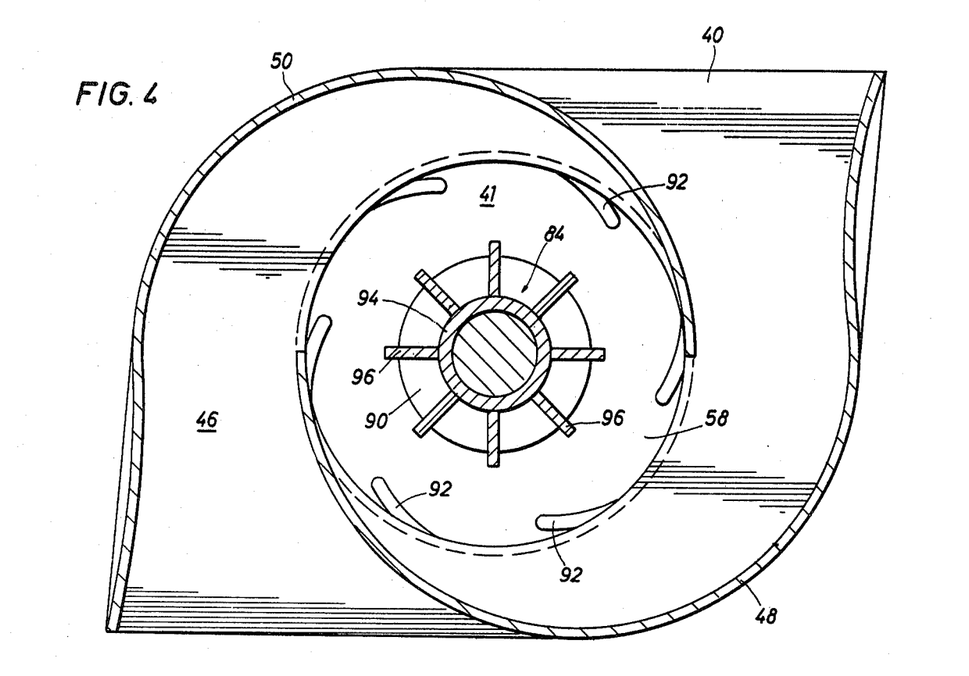
FIG. 4 is a view, enlarged to show details of construction, taken along the lines 4—4 of FIG. 1.
Figure 5:
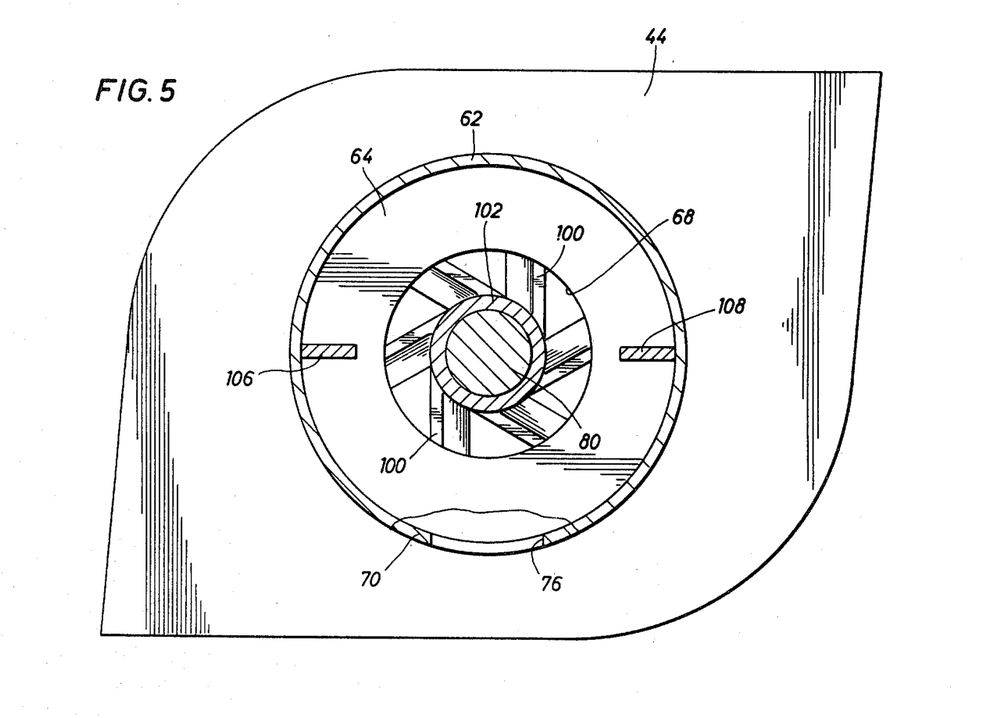
FIG. 5 is a view, enlarged to show details of construction, taken along the lines 5—5 of FIG. 1.

Inlet housing H, as best seen in FIGS. 1, 4 and 5 is of the double volute type having dual inlets 40 and 42. Inlet housing H is formed by a top wall 44, a bottom wall 46, and first and second generally vertical walls 48 and 50. As best seen with reference to FIG. 4, vertical walls 48 and 50 are generally spiral shaped and together with top and bottom walls 44 and 46, respectively, form a generally central inlet chamber 41. A cylindrical neck portion 52 extends downwardly from bottom wall 46 and is provided with a radially outwardly flaring flange 54 which is secured to pump casing C by means of bolts 56. As best seen with reference to FIG. 2, neck portion 52 defines a passageway 58 which provides open communication between the interior of inlet housing H and the interior of pump casing C and registers with aperture 38 to form the axial intake of pump casing C. The top wall 44 of inlet housing H is provided with a generally circular aperture 60. Pump frame F is secured to and disposed above inlet housing H, pump frame F having a generally cylindrical wall 62. As best seen with reference to FIG. 2, the I.D. of cylindrical wall 62 is substantially the same as the diameter of circular aperture 60 in the upper wall 44 of inlet housing H, wall 62 and aperture 60 being generally coaxially disposed with reference to one another. An apertured partition 64 is disposed internally of pump frame F and together with wall 62 defines a vent chamber 66. Partition 64 which is secured to walls 62 is provided with an aperture 68 providing open communication between vent chamber 66 and the interior of inlet housing H. It can be seen that the portion of the wall 62 between apertured partition 64 and upper wall 44 forms a neck portion 70 (See FIG. 6) of inlet housing H with partition 64 cooperating with wall 44 and the intermediate neck 70 to form the upper boundary of the inlet housing.

Diametrically opposed ports 72 and 74 are formed in neck portion 70, ports 72 and 74 being disposed below and closely adjacent apertured partition 64 and providing open communication between the interior and exterior of inlet housing H. While as shown, there are two ports 72 and 74 which are diametrically opposed, it will be apparent that fewer or more ports may be employed and their relative portion can be varied depending upon the mud conditions. For example, with reference to FIG. 5, it can be seen that there is provided a third port 76 which is between ports 72 and 74.

Extending downwardly in a generally vertical disposition through the interior of pump frame F is a pump shaft, shown generally as S. Pump shaft S is comprised of a larger diameter section 78 which extends out of the upper end of and generally the full length of vent chamber 66 and successively smaller diameter sections 79, 80, 81, 83 and 85 which extend downwardly through aperture 68 into chamber 41. Smaller diameter section 79 extends through and is secured to an inlet impeller, shown generally as 82 and located generally in neck portion 70 of the inlet housing. Section 81 extends through a rotor, shown generally as 84. Smaller diameter section 83 extends through a pump impeller, shown generally as 86. Pump impeller 86 is secured to shaft S by means of a nut 88 threadedly received on the smaller diameter section 85 of pump shaft S. Impeller 86 is of a generally conventional design being comprised of a central hub 90 and an impeller plate 91 provided with a series of circumferentially spaced upwardly extending spiral vanes 92.

Rotor 84, as seen with reference to FIG. 2, extends generally between pump impeller 86 and inlet impeller 82. Rotor 84 which is conveniently integrally formed with inlet impeller 82 is comprised of a central cylindrical body portion 94 through which extends section 81 of pump shaft S. Secured to and projecting radially outwardly from body portion 94 are rotor blades 96, blades 96 being circumferentially spaced from one another around cylindrical body portion 94. Rotor 84 and blades 96, as best seen in FIG. 2, extend through chamber 41 down through passageway 58 leading to pump casing C.

Inlet impeller 82 is comprised of an impeller plate 98 and a plurality of vanes 100 which extend outwardly from a central hub 102 in the form of a pinwheel, vanes 100 being also secured to impeller plate 98. As seen in FIG. 3, impeller plate 98 is provided with a central, circular opening 104, opening 104 being generally coaxial with pump shaft S.

Disposed in vent chamber 66 are a pair of ribs 106 and 108, ribs 106 and 108 being secured to the inner surface of cylindrical wall 62. Ribs 106 and 108 project inwardly towards the center of vent chamber 66 and extend generally upwardly from apertured partition 64. While, as shown, ribs 106 and 108 are diametrically opposed to one another, such is not necessary. Additionally, fewer or more ribs may be employed depending upon the type of liquid medium being handled.

Pump shaft S extends upwardly through the open upper end of pump frame F and is journaled in upper and lower pillow blocks 110 and 112, respectively. Secured to pump frame F is a bracket support 114. A bracket 118 is adjustably attached to bracket support 114 so as to permit varying elevations of the pump in the return mud pit 22. A support pipe 116 extends through bracket 118 which spans return mud pit 22 in a manner similar to that described for cross member 24. A guard 120 is attached to bracket support 114 and in generally surrounding relationship to pillow blocks 110 and 112. Also secured to mounting member 114 is a motor 122 which drives a shaft 124. A shroud 126 covers a conventional drive system comprised of pulleys mounted on the upper end of pump shaft S and motor shaft 124, the pulleys being connected by a conventional drive belt. It will be readily appreciated that when motor 122 drives shaft 124, pump shaft S will be driven via the pulley-drive belt system under shroud 126.

Returned or spent mud in return mud pit 22 is drawn into pump P through intake 40 and 42 of inlet housing H. Since intake housing H is of the double volute type, a generally circular or spinning motion is imparted to the mud as it enters the central chamber 41 of inlet housing H. The action of pump impeller 86 serves to draw the mud downwardly out of chamber 41 of inlet housing through axial passageway 58 and into pump casing C. As the mud is drawn into pump casing C, gas, either entrained and/or dissolved in the mud, is disengaged and flows counterflow to the mud feed to pump casing C, the gas tending to rise through the center of a vortex formed in the mud entering pump casing C, the vortex extending up through chamber 41 generally centrally thereof and around rotor 84. The mud is discharged through discharge outlet 32 of pump casing C and forced through riser pipe 12 into degasser vessel 10. Mud which collects between the central hub 90 and the bottom wall 19 drains from pump casing C through drain port 31 back into return mud pit 22. This prevents solids from caking out in pump casing C below impeller 86. As described in U.S. Pat. No. 4,046,528, the mud is further degassed in degassing vessel 10 and is finally discharged into clean mud pit 20.

As noted, the mud in inlet housing H and pump casing C tends to form a vortex, the center of which is a void substantially free of mud but containing air and other gases disengaged from the mud. While in the case of muds of low viscosity, e.g. about 30 to 100 seconds (hereinafter defined), the vortex will be induced solely by the action of pump impeller 86 in muds of higher viscosity, e.g. 100 seconds and greater, there is a tendency for the mud to collapse the void in the center of the vortex and thereby prevent gas from escaping from pump impeller 86 upwardly through inlet housing H and ultimately into vent chamber 66 of pump frame F. To ensure that a gas column or mud void is maintained between pump impeller 86 upwardly into pump frame F, rotor 84 is employed. Blades 96 force the mud radially outwardly away from rotor body 94 and provide a gas column up through which gas disengaged by impeller 86 and which collects at hub 90 can escape.

Regardless of the viscosity, there is a tendency for the mud to rise upwardly from inlet housing H through aperture 68 in apertured partition 64 into vent chamber 66. Mud which enters vent chamber 66 and is not removed has a tendency to cake out on the interior of wall 62. Also, if the volume of mud in chamber 66 becomes great enough, it can interfere with the gas flow upwardly from impeller 86. When the latter occurs, the disengaged gas is not allowed to be vented through the upper end of pump frame F. In order to remove the mud from the interior of pump frame F, inlet impeller 82 is employed. Inlet impeller 82 is designed such that its rotational movement draws the mud downwardly out of vent chamber 66 through aperture 68 and back into the interior of inlet housing H.

In the case of muds having high viscosities, e.g. 150 seconds or greater, the mud which enters vent chamber 66 has a tendency not only to rise upwardly along the walls 62 but, because of its high viscosity, to substantially form a seal between wall 62 and the enlarged portion 78 of pump shaft S. To counteract this tendency, ribs 106 and 108 are employed. The ribs 106 and 108 tend to impair or spoil the spinning motion of the mud which enters the vent chamber 66. The turbulence thus induced in the mud in vent chamber 66 prevents a mud seal from forming or bridging between the wall 62 and the enlarged portion 78 of pump shaft S.

Because of the turbulence and gas disengagement occurring in pump casing C and inlet housing H, there is a tendency for frothing or foaming to occur in the upper part of inlet housing H underneath apertured partition 64. This is particularly true in the case of high viscosity muds. The froth or foam impairs the ability of inlet impeller 82 to pump down vent chamber 66 and may also interfere with the escape of gas upwardly from pump casing C through inlet housing H and into vent chamber 66. The ports 72 and 74 serve to provide a means whereby the froth or foam can be discharged from the interior of pump housing H back into return mud pit 22. Additionally, the froth or foam and any mud which is pumped through ports 72 and 74 tends to remove any solids which accumulate on the top of upper wall 44 of inlet housing H.

The dynamics of the apparatus are such that such foam, froth or the like resists moving downwardly within the inlet housing. If such a downward path were the only one available, this gas might eventually cause vapor locking of the inlet impeller. In the embodiment of FIGS. 1–6, ports 72 and 74 simply direct the froth, foam or other gas laterally outwardly through neck 70 of the upper portion of the inlet housing H. Thence, this gas will ordinarily pass upwardly through the mud in pit 22. In some instances, it may be desirable to positively direct froth or other gas accumulating near partition 64 vertically upwardly away from the inlet housing. FIGS. 7-11 show several alternative embodiments of the invention, each of which includes an egress passage system which provides such positive vertical direction to the froth, foam or other gas being removed from the upper portion of the inlet housing.

Figure 7:
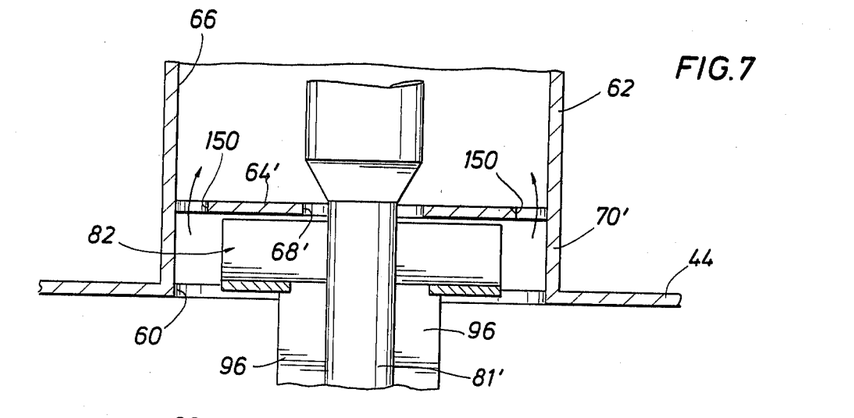
FIG. 7 is a partial vertical cross-sectional view through an inlet housing and adjacent portions of a pump incorporating an alternative egress passage system for froth removal.

FIG. 7 represents an embodiment which involves relatively little modification of the apparatus shown in the preceding figures. In particular, the basic configuration of the walls forming the inlet housing and pump casing are similar to those of the preceding embodiment, and include a top wall 44 for the inlet housing, a cylindrical pump frame 62 extending upwardly from the central aperture 60 of wall 44, the lower portion 70' of frame 62 forming a cylindrical neck in the center of the upper portion of the inlet housing. The inlet housing and the vent chamber are separated by a partition wall 64', which thus cooperates with housing parts 44 and 70' to define the upper boundary of the inlet housing. Partition 64' has a central aperture 68', for purposes described hereinabove. The rotary portions of the pump are similar to those in the preceding figures, and include a shaft, generally diagrammatically indicated at 81' to which rotor blades 96 and inlet impeller 82 are affixed in any suitable manner. The embodiment FIG. 7 differs from the preceding figures primarily in that there are no lateral ports in neck 70', but rather, partition 64' has a pair of diametrically opposed ports 150 opening vertically therethrough to positively direct gas accumulating in the neck portion of the inlet housing under partition 64' vertically upwardly from said neck portion 70' into the vent chamber 66 defined by the pump frame 62. It can be seen that a device substantially as shown in FIGS. 1-6 could be fairly easily modified to the form shown in FIG. 7 by simply plugging lateral ports 72 and 74 in neck 70 and forming new vertically opening ports in aperture 64. Preferably, such vertically opening ports are, as shown at 150 in FIG. 7, located near the laterally outer extremity of neck 70' in partition 64'.

Figure 8:
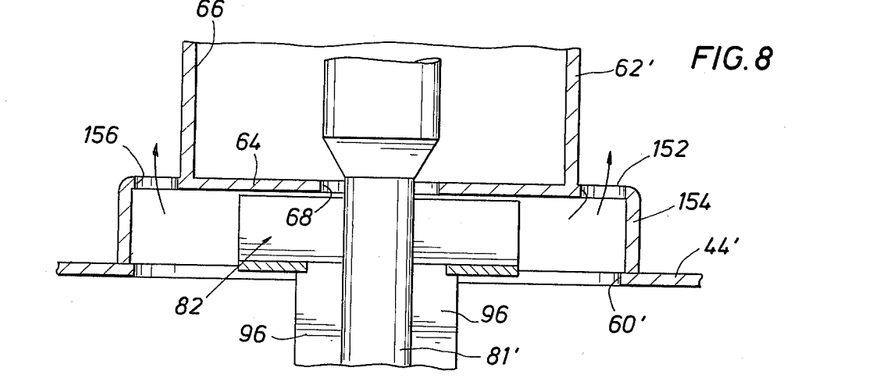
FIG. 8 is a view similar to that of FIG. 7 showing a second alternative egress passage system.

FIG. 8 shows another variation including rotary parts 81', 96 and 82, substantially identical to like numbered parts of the embodiment of FIG. 7. The embodiment of FIG. 8 differs from that of FIG. 7 primarily in that the top wall 44' of the inlet housing has been modified so that its central aperture 60' is substantially larger than the diameter of the major portion of frame 62' and the vent chamber 66 defined thereby. Pump frame 62', on the other hand, has been modified so that its walls do not continue downwardly from vent chamber 66 to the top wall of the inlet housing in a straight, uniform diameter fashion. Rather, the main cylindrical wall 62' terminates at partition 64, which divides the vent chamber 66 from the interior of the inlet housing. At the lower end of wall 62', and adjacent partition 64, is formed an annular flange 152 extending radially outwardly from the lower end of cylindrical wall 62'. A cylindrical neck wall 154 extends downwardly from the outer extremity of flange 152 to top wall 44' of the inlet housing, and is secured thereto in any suitable manner, such as by welding. The inner diameter of cylindrical neck 154 is approximately equal to that of the central aperture 60' of wall 44'. Parts 44', 154, 152, and 64 all cooperate to define the upper boundary of the inlet housing. However, due to the provision of flange 152 and neck 154, the upper neck portion of the inlet housing is significantly wider than the adjacent vent chamber 66, and vertical ports 156 may be provided in flange 152. This permits froth or gas accumulating in the upper neck portion of the inlet housing, adjacent partition 64, to be positively directed vertically upwardly away from the inlet housing, but to the exterior of the pump, rather than into the vent chamber 66.

Figure 9:
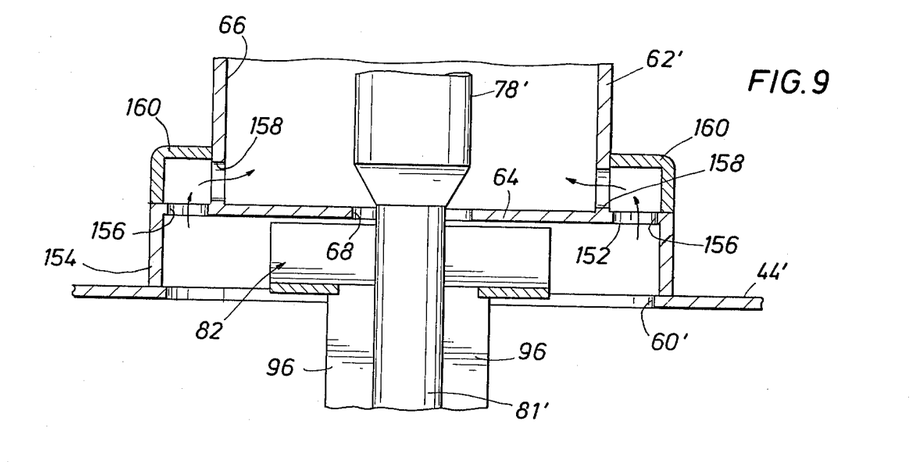
FIG. 9 is a view similar to that of FIG. 7 showing a third alternative egress passage system.

FIG. 9 discloses an embodiment which combines certain features of the embodiments of FIGS. 7 and 8. As in the embodiment of FIG. 8, the top wall 44' of the inlet housing has been modified to provide a larger central aperture 60', and the main, small diameter portion of pump frame 62' has been terminated at partition 64, while a radially outwardly extending flange 152, and a downwardly extending neck 154 have been added, all as in the embodiment of FIG. 8. Likewise, ports 156 have been provided, opening vertically through flange 152, laterally outwardly of vent chamber 66. However, in order to direct gas emerging from ports 156 into the vent chamber 66, rather than to the mud pit surrounding the exterior of the pump, a second set of ports 158 has been formed laterally through the wall 62' of the vent chamber 66, above partition 64. Additionally, a pair of hood-like baffles 160 have been welded to the outer periphery of flange 152 and to wall 62' thereabove. Each of the baffles 160 defines a conduit by which one of the ports 156 is communicatively connected with a respective one of the ports 158.

Figure 10:
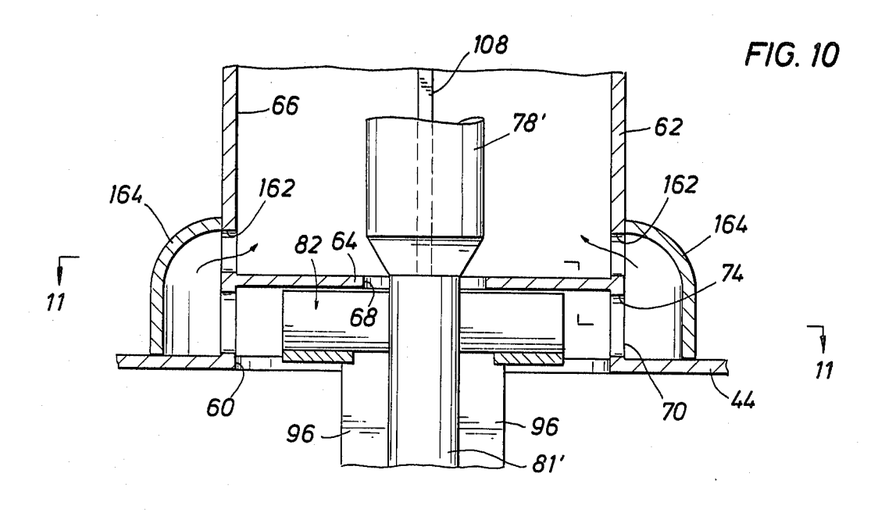
FIG. 10 is a view similar to that of FIG. 7 showing a fourth alternative egress passage system.
Figure 11:
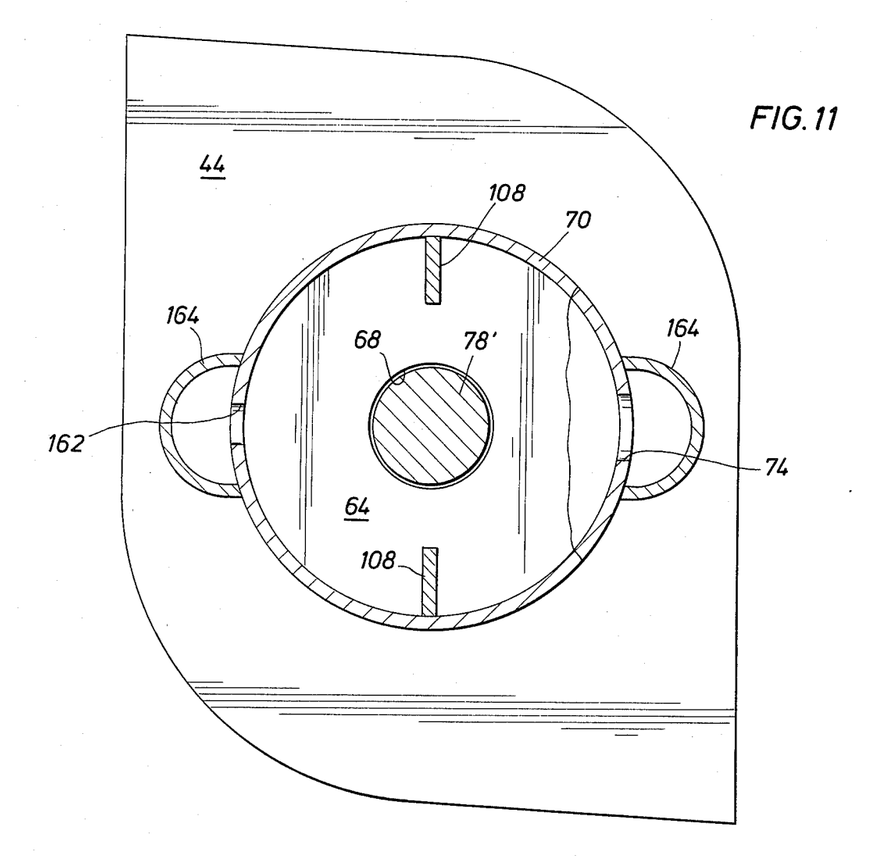
FIG. 11 is a view taken along the line 11—11 in FIG. 10.

Finally, FIGS. 10 and 11 show an embodiment which can be readily formed by modifying the embodiment of FIGS. 1-6. In particular, top wall 44 of the inlet housing has been retained in its original form, with its central aperture 60 being of approximately the same diameter as the vent chamber 66. Likewise, pump frame 62 has been retained in its original form, with its main cylindrical portion extending straight downwardly to wall 44 to form a neck 70 of the inlet housing. Also, lateral ports 72 and 74 in neck 70 have been retained. In order to insure that gas emerging through ports 72 and 74 is directed vertically upwardly away from the inlet housing, and more specifically, into the vent chamber 66, a second set of ports 162 has been formed laterally through wall 62, opening into vent chamber 66 just above partition 64. Half-tubular conduit members or baffles 164 have been welded to wall 44 and wall 62 so that each conduit member 164 forms a generally vertical passage communicatively interconnecting one of the ports 72 or 74 with a respective one of the ports 162. Thus, the embodiment of FIGS. 10 and 11 can be formed as a modification of the embodiment of FIGS. 1-6 by simply adding ports 162 and conduit members 164 to the existing structure.

Of the preceding embodiments, those of FIGS. 7 and 9-11, in which the froth is directed into the vent chamber, are particularly efficient in removing such froth since the vent chamber is essentially at atmospheric pressure. Thus, the hydraulic head of the mud in pit 22 is available to act on the froth, effectively pushing it upwardly, thereby facilitating its movement in the desired direction. However, in some cases a structure such as that of FIG. 8, in which the egress passages discharge directly to the pit, may be preferred for simplicity of construction.

The centrifugal pump and degassing system described above is eminently suited for handling muds or other liquid containing mediums of varying viscosities. It is particularly useful for high viscosity drilling muds. Viscosity, as that term is used herein, is defined as the number of seconds required for one liter of the liquid containing medium to empty from a funnel spout of given orifice size. Thus, the viscosity measurement used herein is similar to a Saybolt viscosity measurement. The funnel employed in the viscosity measurements used herein is known as a Marsh funnel. Using the viscosity measuring technique described above, water has a viscosity of about 26 seconds. In the case of drilling muds, viscosities of 30–50 seconds can generally be handled by degassers such as shown in U.S. Pat. No. 4,046,528 without encountering any difficulty. However, at viscosities of greater than 130 seconds, the efficiency of the degassing system is markedly decreased. As previously observed, muds of such high viscosity can form mud seals in the vent chamber 66 preventing the escape of the disengaged gas. Additionally, such high viscosity muds result in a froth or foam formation which prevents emptying of the mud out of the vent chamber 66. It has been found that using the degassing system of the present invention with the incorporation of the ribs 106, 108 in the vent chamber 66 and either the vent ports 72, 74 or vertical egress passages (FIGS. 7–11), muds having viscosities of up to 400 seconds and greater can be handled with relative ease.

It will be understood that ribs 106 and 108 can be replaced by any means which will spoil the spinning motion of mud which enters chamber 66. Additionally, rotor 84 need not be provided with blades but can take the form of an auger, a spiral grooved member or for that matter any device which can be used to ensure that a passageway is kept open through the mud to permit gas to flow axially upwardly through the mud and escape via vent chamber 66.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. In a system for degassing liquid containing mediums, said system including a degassing vessel having an inlet and an outlet and a generally vertical shaft centrifugal pump connected to said vessel for introducing said liquid medium into said vessel, the improvement wherein said pump comprises:
   means defining an inlet housing, said inlet housing having at least one inlet for the intake of said liquid medium;
   means defining a pump casing having at least one outlet for the discharge of said liquid medium, said pump casing and said inlet housing being in open communication with one another;
   a pump impeller rotatably mounted in said pump casing for pumping said liquid medium into said degassing vessel;
   a pump frame at least partially defining a vent chamber, said pump frame including an apertured partition, said aperture providing open communication between said vent chamber and said inlet housing;
   said inlet housing being disposed between said vent chamber and said pump casing, said pump casing being disposed below said inlet housing;
   an inlet impeller rotatably mounted in said inlet housing closely adjacent said apertured partition and operative to direct fluid from said vent chamber into said inlet housing;
   and egress passage means communicating with said inlet housing adjacent said apertured partition for directing gas accumulating in the upper portion of said inlet housing vertically upwardly away from said inlet housing.

2. The system of claim 1 wherein said inlet housing includes an upper boundary at least partially defined by said apertured partition, and wherein said egress passage means comprises first port means opening vertically through said upper boundary.

3. The system of claim 2 wherein said first port means is disposed in said apertured partition in communication with said vent chamber.

4. The system of claim 2 wherein said first port means is disposed laterally outwardly of said vent chamber.

5. The system of claim 4 wherein said first port means is in open communication with the exterior of said pump.

6. The system of claim 4 wherein said egress passage means further comprises second port means opening through said pump frame above said upper boundary of said inlet housing and baffle means defining a conduit interconnecting said first and second port means.

7. The system of claim 1 wherein said egress passage means comprises first port means opening laterally through said inlet housing, second port means opening laterally through said pump frame and vertically extending conduit means interconnecting said first and second port means.

8. The system of claim 1 wherein said egress passage means is in open communication with the exterior of said pump.

9. The system of claim 1 wherein said egress passage means is in communication with said vent chamber.

10. The system of claim 1 wherein there are two such egress passage means generally diametrically opposed from each other.

11. The system of claim 1 including rotor means disposed between said pump impeller and said inlet impeller, said rotor means being mounted for coaxial rotation with said pump impeller and said inlet impeller and including means for providing a void substantially free of said liquid medium above said pump impeller.

12. The system of claim 11 wherein said rotor means includes a rotor shaft and a plurality of circumferentially spaced, radially outwardly extending rotor blades secured to said rotor shaft.

13. The system of claim 12 wherein said blades extend generally from said pump impeller to said inlet impeller.

14. The system of claim 11 wherein said inlet impeller, said pump impeller and said rotor means are secured to a common pump shaft.

15. The system of claim 11 wherein said inlet housing has a plurality of inlets.

16. The system of claim 1 further including means disposed in said vent chamber for impairing the spinning movement of liquid medium in said vent chamber adjacent said aperture.

17. The system of claim 16 wherein said means for impairing said spinning movement includes at least one rib member extending upwardly from said apertured partition and projecting inwardly from said pump frame.

18. The system of claim 17 wherein there are a plurality of said rib members.

19. The system of claim 16 wherein said pump shaft comprises a first section disposed in said vent chamber and a second section extending downwardly from said first section through said aperture, said second section having a smaller diameter than said first section.

20. The system of claim 1 wherein said pump casing is provided with a drain opening disposed below said pump impeller.

21. In a generally vertical shaft centrifugal pump for handling gas laden liquid containing mediums, the improvement wherein said pump comprises:

means defining an inlet housing, said inlet housing having at least one inlet for the intake of said liquid medium;

means defining a pump casing having at least one outlet for the discharge of said liquid medium, said pump casing and said inlet housing being in open communication with one another;

a pump impeller rotatably mounted in said pump casing, a pump frame at least partially defining a vent chamber, said pump frame including an apertured partition, said aperture providing open communication between said vent chamber and said inlet housing;

said inlet housing being disposed between said vent chamber and said pump casing, said pump casing being disposed below said inlet housing;

an inlet impeller rotatably mounted in said inlet housing closely adjacent said apertured partition, and operative to direct fluid from said vent chamber into said inlet housing;

and egress passage means communicating with said inlet housing adjacent said apertured partition for directing gas accumulating in the upper portion of said inlet housing vertically upwardly away from said inlet housing.

22. The system of claim 21 wherein said inlet housing includes an upper boundary at least partially defined by said apertured partition, and wherein said egress passage means comprises first port means opening vertically through said upper boundary.

23. The system of claim 22 wherein said first port means is disposed in said apertured partition in communication with said vent chamber.

24. The system of claim 22 wherein said first port means is disposed laterally outwardly of said vent chamber.

25. The system of claim 24 wherein said first port means is in open communication with the exterior of said pump.

26. The system of claim 24 wherein said egress passage means further comprises second port means opening through said pump frame above said upper boundary of said inlet housing and baffle means defining a conduit interconnecting said first and second port means.

27. The system of claim 21 wherein said egress passage means comprises first port means opening laterally through said inlet housing, second port means opening laterally through said pump frame and vertically extending conduit means interconnecting said first and second port means.

28. The system of claim 21 wherein said egress passage means is in open communication with the exterior of said pump.

29. The system of claim 21 wherein said egress passage means is in communication with said vent chamber.

30. The system of claim 21 wherein there are two such egress passage means generally diametrically opposed from each other.

31. The system of claim 21 including rotor means disposed between said pump impeller and said inlet impeller, said rotor means being mounted for coaxial rotation with said pump impeller and said inlet impeller and including means for providing a void substantially free of said liquid medium above said pump impeller.

32. The system of claim 31 wherein said rotor means includes a rotor shaft and a plurality of circumferentially spaced, radially outwardly extending rotor blades secured to said rotor shaft.

33. The system of claim 32 wherein said blades extend generally from said pump impeller to said inlet impeller.

34. The system of claim 31 wherein said inlet impeller, said pump impeller and said rotor means are secured to a common pump shaft.

35. The system of claim 31 wherein said inlet housing has a plurality of inlets.

36. The system of claim 21 further including means disposed in said vent chamber for impairing the spinning movement of liquid medium in said vent chamber adjacent said aperture.

37. The system of claim 36 wherein said means for impairing said spinning movement includes at least one rib member extending upwardly from said apertured partition and projecting inwardly from said pump frame.

38. The system of claim 37 wherein there are a plurality of said rib members.

39. The system of claim 36 wherein said pump shaft comprises a first section disposed in said vent chamber and a second section extending downwardly from said first section through said aperture, said second section having a smaller diameter than said first section.

40. The system of claim 21 wherein said pump casing is provided with a drain opening disposed below said pump impeller.

* * * * *